No. 862,055. PATENTED JULY 30, 1907.
P. E. COLLINS.
TRANSPARENCY.
APPLICATION FILED MAR. 16, 1905.
Fig. 1.
Fig. 2.
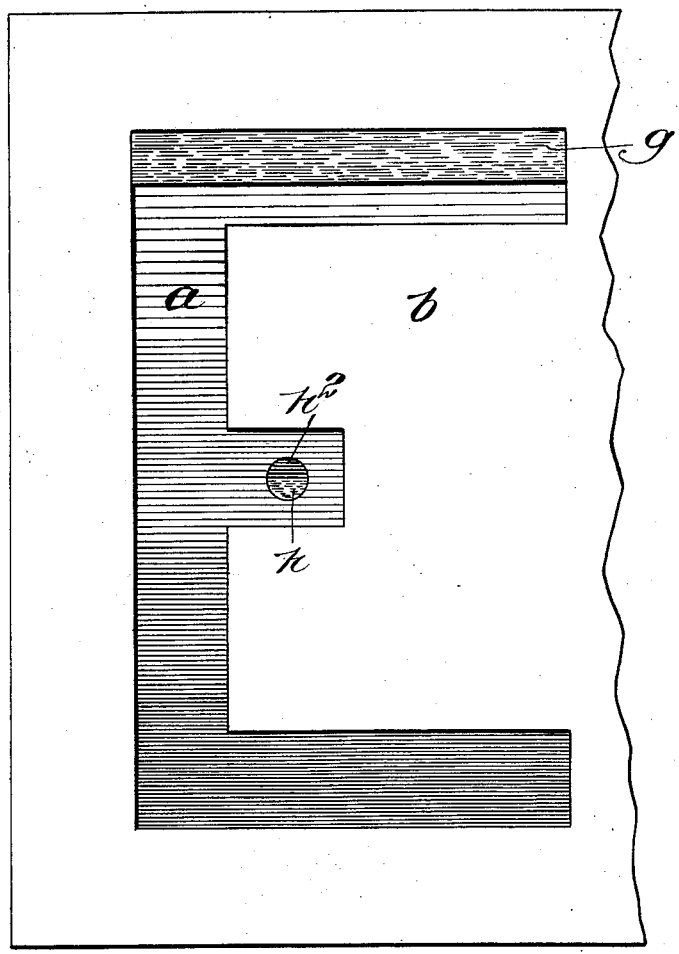
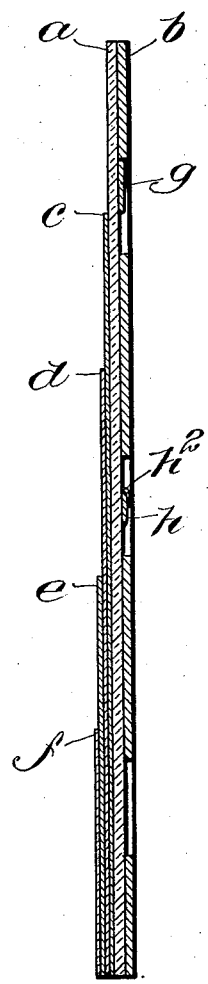
Witnesses:
Jas. J. Maloney.
Margaret E. Powers
Inventor:
Paul E. Collins:
by J. P. and H. J. Livermore
Atty's.

UNITED STATES PATENT OFFICE.

PAUL E. COLLINS, OF BOSTON, MASSACHUSETTS, ASSIGNOR, BY DIRECT AND MESNE ASSIGNMENTS, TO ELECTRIC NOVELTY MACHINE COMPANY, OF BOSTON, MASSACHUSETTS, A CORPORATION OF MASSACHUSETTS.

TRANSPARENCY.

No. 862,055.      Specification of Letters Patent.      Patented July 30, 1907.

Application filed March 16, 1905. Serial No. 250,434.

*To all whom it may concern:*

Be it known that I, PAUL E. COLLINS, a citizen of the United States, residing in Boston, in the county of Suffolk and State of Massachusetts, have invented an Improvement in Transparencies, of which the following description, in connection with the accompanying drawings, is a specification, like letters on the drawings representing like parts.

The present invention relates to a transparency, the purpose of the invention being to obtain an illuminated design, such as a picture or letter upon an opaque back-ground with a delicately shaded color effect, as well as a more or less scintillating effect in parts of the design.

To illustrate the invention, I have shown the same as embodied in an illuminated letter to form part of a transparency for an advertising design, for example, it being obvious, however, that the same effect can be obtained in connection with a picture or any conventional design.

In carrying out the invention, I utilize as the base or mount any transparent or semi-transparent substance, such as glass or cloth, and I cover the mount with an opaque substance in which the design is formed, so that the design itself is transparent with an opaque back-ground. I then color the mount with a thin dye which can be readily shaded without getting a streaky effect, and, in order to obtain a more accentuated effect of light and shade, I cover the back-ground of the mount with a semi-opaque substance, such as paper, and place varying thicknesses of the paper or other substance over different parts of the design.

A further feature of the invention consists in covering the mount in front of the design with a sheet of celluloid in certain parts, the celluloid, which may be colored or not, as desired, giving a shiny or scintillating effect which adds to the artistic appearance of the design. The celluloid, furthermore, may be rendered opaque in parts by a covering of plaster or similar substance, and may be colored, if desired, by means of dyes or paint.

Figure 1 is a view of a portion of a transparency embodying the invention; and Fig. 2 is a vertical section showing the construction to illustrate the layers of material which are placed upon the surfaces of the mount in making up the transparency.

The mount $a$ is of any suitable transparent material capable of being colored and delicately shaded, the said mount, which may be of cloth, or, in the case of a sign, preferably of ground glass, being covered on the front with a layer of opaque substance $b$ in which the design is formed, the said design being herein shown as in the form of the letter E. This leaves the design transparent upon an opaque back-ground, so that when the mount is illuminated from behind, the design alone will show.

In order to obtain a colored effect, the mount is colored on the back, and I find that, by using a laquer and an anilin dye, the material can be delicately shaded without any streaky effect when light is transmitted through it. In order further to emphasize the light and shade, I place upon the back of the mount a series of layers $c$, $d$, $e$, and $f$, of translucent material, it being practicable to use ordinary paper for the purpose, the layer $c$ being shown as extending over nearly the entire design (or the whole of design, if necessary) while the layer $d$ is added to the layer $c$ over a part of the design, and the layers $e$ and $f$ added to the layers $c$ and $d$ over still smaller parts of the design. It is obvious that any number of layers may be employed, and that the light will be obscured to the greatest extent where the most layers are superimposed.

As an additional feature of the invention, I obtain a scintillating effect by using sheet celluloid which may be colored or plain, as desired, the celluloid being applied to the front surface of the mount, there being herein shown a piece of sheet celluloid $g$ covering the upper part of the design, this part being shown as uncovered at the back, and therefore substantially transparent. The celluloid may, if desired, be shaded by applying to parts thereof an opaque substance such as plaster, this feature being illustrated at $h$ where a small disk of celluloid is shown as applied at the front of the sign, and partially covered with an opaque substance $h^2$, it being practicable, in this case, to apply coloring matter to the surface of the opaque substance, and the surface of the disk of celluloid, so that a solid color will show when the sign is not illuminated and a shaded color when the sign is illuminated. The opaque substance may also be applied on any portion of the design, for example, directly on the surface of the mount without the intervention of the celluloid.

The layers of semi-opaque substance at the back, and the pieces of celluloid at the front, are herein shown as conventionally arranged for the purpose of clearly illustrating the invention, it being obvious that, by varying the arrangement, any desired effect can be obtained, either in connection with a letter, or a conventional design, or an actual picture in which the illumination is such as to imitate, for example, the effect of a sun-set, or like natural illumination.

What I claim is:

1. In a transparency, the combination with a transparent mount; of an opaque substance with a design formed therein on the surface of said mount; and a semi-opaque substance secured to the opposite surface of said mount in varying thicknesses, as set forth.

2. In a transparency, the combination with a transparent mount; of an opaque substance on the front surface of said mount, the said substance having a design formed therein; and a sheet of celluloid conforming to the design, or a portion thereof, secured to the front of the mount within the outlines of the design, as set forth.

3. In a transparency, the combination with a transparent mount, the transparent portion of which is in the form of a design; of a sheet of celluloid secured to said mount within the outlines of the design, said sheet of celluloid being partially covered with an opaque substance and having coloring matter applied to the face upon which said opaque substance is applied, as set forth.

4. In a transparency, a transparent mount, and opaque substance on said mount to form a back-ground for the design; opaque substance obscuring parts of the design, and coloring matter applied to the design and covering said opaque substance also, substantially as described.

In testimony whereof, I have signed my name to this specification in the presence of two subscribing witnesses.

PAUL E. COLLINS.

Witnesses:
HENRY J. LIVERMORE,
MARAGARET E. COVENEY.